April 21, 1959   L. H. FLORA   2,883,011
FASTENING DEVICE
Original Filed Nov. 5, 1951
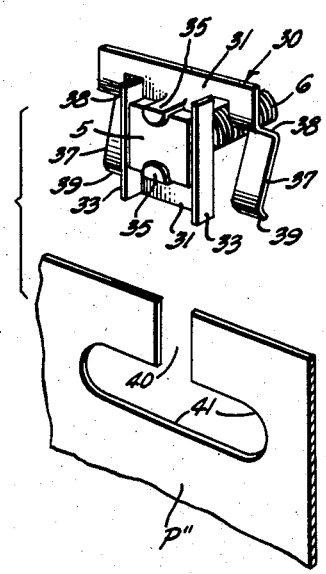
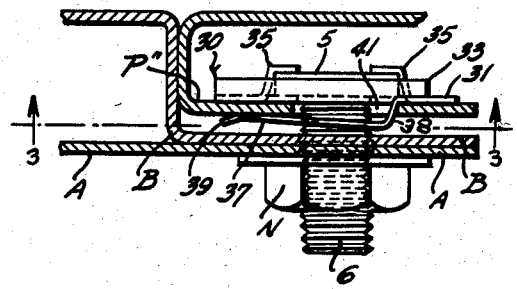
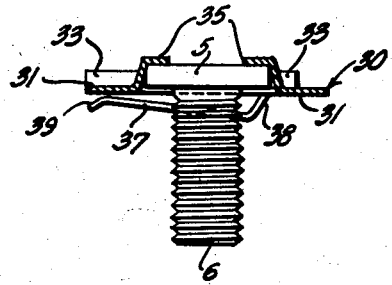
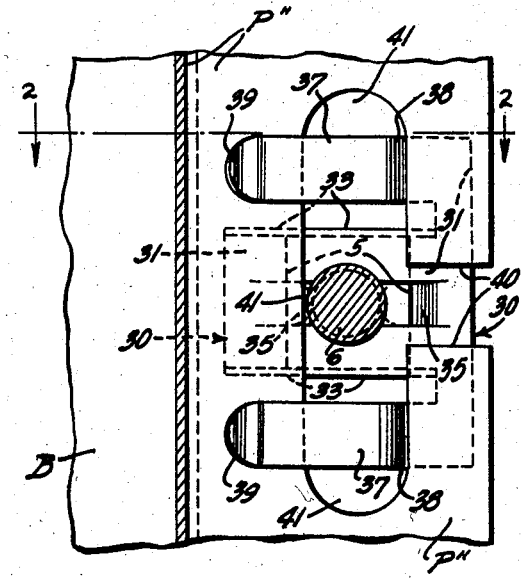
INVENTOR
LAURENCE H. FLORA
BY H. G. Lombard
ATTORNEY United States Patent Office 2,883,011
Patented Apr. 21, 1959

2,883,011

FASTENING DEVICE

Laurence H. Flora, Cleveland, Ohio, assignor to Tinnerman Products, Inc., Cleveland, Ohio, a corporation of Ohio Original application November 5, 1951, Serial No. 254,925, now Patent No. 2,748,906, dated June 5, 1956. Divided and this application February 23, 1954, Serial No. 411,804

2 Claims. (Cl. 189—36)

This invention relates in general to bolt fastened installations and deals, more particularly, with improvements in bolt holding devices for attaching standard bolts, screws, rivets, and similar headed studs in fastening position in an assembly prior to the application of a cooperating nut device thereto for securing the parts of the assembly.

This application is a division of prior copending application Serial Number 254, 925 filed November 5, 1951.

In many assemblies, it is necessary or desirable to use a standard nut and bolt fastening means but it is usually a difficult problem, especially in blind locations, for the operator to hold the bolt in place as the nut is applied, or otherwise, to maintain the bolt against rotation during the final tightening of the nut therewith. In most assemblies in which the rearward side of a part is not conveniently or readily accessible for holding a bolt in fastening position prior to application of the cooperating nut, it is necessary to resort to some form of riveting, welding or other attaching means for retaining the bolt is fastening position. In the average installation requiring a cheap, inexpensive bolt holding means, the cost of welding or riveting or installing clinch-on bolt holders, and the like, generally is so expensive as to make the use thereof prohibitive.

A primary object of the present invention, therefore, is to provide an improved sheet metal bolt holder or retainer which is relatively simple and inexpensive to manufacture in comprising a simplified construction for fitting onto the bolt head together with an easily and quickly applied clip type of attaching means adapted to clasp a part adjacent a bolt hole therein to hold the bolt in attached fastening position in said bolt hole.

A further object of the invention is to provide a bolt holder of this character comprising cooperating base and arm portions for embracing the apertured part to which the bolt is to be attached, together with means on one of said portions adapted to lock the bolt holder in attached fastening position.

Another object of the invention is to provide an improved bolt holder, such as described, comprising a one-piece sheet metal clip device, or the like, adapted to be easily and quickly applied to attached fastening position on a part to hold the bolt in attached fastening position while otherwise retaining the bolt against axial displacement and/or turning as the associated nut is threaded thereon and tightened.

A further object of the invention is to provide an improved fastening installation in which the aforesaid bolt holder is preassembled with the bolt and adapted to be applied over the edge of a part having a slot for passing the bolt shank in the application of the bolt holder to attached fastening position on such part.

Further objects and advantages and other new and useful features in the construction, arrangement and general combination of features of the invention will be apparent as the following description proceeds with reference to the accompanying drawings, for purposes of illustration but not of limitation, in which like reference characters designate like parts throughout, and in which:

Fig. 1 shows a bolt holder in accordance with the invention which is preassembled with the bolt and adapted to be applied to fastening position over an apertured edge portion of a panel, or the like, having a slot for passing the shank of the bolt in the application of the bolt holder to fastening position;

Fig. 2 is a vertical sectional view, as along line 2—2 of Fig. 3, showing the bolt holder of Fig. 1 in applied fastening position in an assembly;

Fig. 3 is a sectional view of Fig. 2 on line 3—3, looking in the direction of the arrows; and Fig. 4 is a sectional view along the transverse center line of the bolt holder shown in Figs. 1-3, inclusive.

Generally speaking, a bolt holder in accordance with the invention is best provided from a suitable sheet metal strip, preferably spring metal or cold rolled metal having spring-like characteristics. The bolt holding portion of the device is readily adapted to be provided in various forms to accommodate any selected type of bolt head together with an attaching portion in the form of one or more cooperating spring arms, or the like, by which the bolt holder is easily and quickly applied to fastening position on an apertured edge portion of a panel or other part substantially by a clip or clasping type fastening action. The attaching means of the bolt holder is desirably provided by cooperating portions for clasping the opposite surfaces of the part to which the bolt holder is attached together with means on one of said portions receivable in the bolt hole in said part for locking the bolt holder in such attached position.

Referring now, more particularly to the drawing, it will be understood that the fastening device comprising the combined bolt and bolt holder of the invention is of a character adapted for a wide range of applications and uses and may be installed in different ways depending on the nature of the installation. The bolt holder 30 is formed from a sheet metal section of a size and configuration determined by the size and shape of the bolt head with which it is to be used. The bolt holder may be provided for any type of bolt head and, in the present example, is shown as constructed for a square headed bolt 5 from a piece of sheet metal defining a base 31 and adjoining upturned flanges 33 for engaging the opposite side faces of said square headed bolt 5. A pair of tongues 35 is stamped upwardly out of the base 31 in an advantageous manner whereby the area from which said tongues 35 are provided defines an opening for receiving the shank of the bolt 6. The bolt holder 30 is assembled with the bolt head 5 seated on the base 31 and the side flanges 33 engaging the opposite side faces of the bolt head to prevent relative rotation thereof while the tongues 35 are disposed in overlapping engagement with the top of the bolt head 5 to prevent axial displacement of the bolt from assembled relation with said bolt holder 30.

At opposite ends of the fastener base 31, there are provided a pair of attaching arms 37 which are bent downwardly and outwardly from the plane of the base 31 in a manner to define pronounced shoulders 38 adjoining said base 31. These arms 37 otherwise extend inwardly in inclined relation toward the base 31 and terminate in outwardly flared ends 39 for facilitating the initial application of the bolt holder to attached position over the edge of an apertured supporting panel P".

The supporting part in the form of a panel P", or the like, is prepared with a T-shaped opening, as best seen in Fig. 1, comprising a slot 40 leading to an elongate bolt hole 41. If desired, the slot 40 may be omitted and the bolt hole 41 provided as a simple transverse opening such that the edge of the panel is imperforate and of maximum strength where necessary or desirable. The combined bolt and bolt holder is applied to the panel opening, as illustrated in Fig. 1, in a manner to position the bolt head 5 at the rearward side of said panel P″ while the shank 6 projects from the forward side thereof in position for the application of a nut N thereto for securing one or more cooperating parts A, B, to said panel P″. The fastening device is applied by advancing the bolt shank 6 through the slot 40 with the base 30 of the bolt holder seated on the rearward side of said panel P″, and simultaneously slipping the free ends of the arms 37 through the hole 41 from the rearward side of panel P″ to extend to the opposite forward side of said panel P″. The outwardly flared extremities 39 on said arms 37 facilitate this action by causing a gradual outward camming of said arms 37 over the engaged edge of the bolt hole 41.

The bolt holder is then advanced to the fully attached position thereof in which the shoulders 38 on the arms 37 snap into the bolt hole 41 in engagement with the adjacent marginal edge portion of said opening 41, substantially as seen in Figs. 2 and 3. The shoulders 38, accordingly, lock the bolt holder in fully attached position with the base 31 of the bolt holder engaging the rearward side of the panel P″ in cooperation with the arms 37 engaging the forward side of said panel P″.

When the bolt hole is provided as a simple transverse opening without the slot 40, the combined bolt and bolt holder is readily applied to a similar attached position by inserting the bolt shank 6 through the hole 41 and canting and working the device as necessary for the arms 37 to pass through said opening and engage the forward side of the panel P″ in cooperation with the base 31 engaging the rearward side of said panel P″, as aforesaid.

The bolt holder, in any form, preferably is constructed of relatively thin sheet metal the thickness of which is selected according to service requirements and the predetermined size of the bolt to be retained thereby. The bolt holder is most effective when provided of spring metal suitably spring tempered and otherwise treated to give the desired toughness and hardness. A cheap and highly effective bolt holder may be provided from cold rolled metal such as cold rolled steel which is untempered but of a spring metal nature and capable of providing a durable and reliable fastening device as and for the purposes described.

While the invention has been described in detail with a specific example, such example is intended as an illustration only, inasmuch as the invention fully contemplates various modifications which may be provided without departing from the spirit and scope of the invention.

What is claimed is:

1. A fastening assembly comprising a panel provided with an elongated bolt hole and a combined bolt and bolt holder in substantially the form of a clasp securing said bolt in said bolt hole with the bolt head positioned over said bolt hole, said bolt holder comprising a sheet metal body providing a base having an opening receiving the shank of said bolt with the head of said bolt bearing on the upper side of said base, said base having partially severed areas at opposite faces of said bolt head providing a pair of arms spaced laterally outwardly from said clamping member and bent to project from the underside of said base, each of said arms comprising an inner section bent generally diagonally outwardly from the plane of said base and an outer section merging with said inner section and bent generally diagonally inwardly toward said base, and portions provided from said base in the spaces between said bolt head and said arms bent to project from the upper side of said base into abutting relation with said bolt head, the shank of said bolt extending through said bolt hole and projecting normal to said panel, said base of the bolt holder seating on one surface of said panel over said bolt hole and said pair of arms extending through said bolt hole along the major axis of the latter and clasping the opposite surface of said panel in cooperation with said base, each of said inner sections of said arms being received in said bolt hole in generally abutting relation with a defining surface thereof and retaining the bolt holder in attached position.

2. A fastening assembly comprising a panel provided with an elongated bolt hole and a combined bolt and bolt holder in substantially the form of a clasp securing said bolt in said bolt hole with the bolt head positioned over said bolt hole, said bolt holder comprising a sheet metal body providing a base having an opening receiving the shank of said bolt with the head of said bolt bearing on the upper side of said base, said base having partially severed areas at opposite faces of said bolt head providing a pair of arms spaced laterally outwardly from said bolt head and bent to project from the underside of said base, flanges provided from said base in the spaces between said bolt head and said arms, said flanges being bent to project from the upper side of said base into engagement with said opposite faces of said bolt head, and tongues provided on said base between said flanges engaging other faces of said bolt head, the shank of said bolt extending through said bolt hole and projecting normal to said panel, said base of the bolt holder seating on one surface of said panel over said bolt hole and said pair of arms extending through said bolt hole along the major axis of the latter and clasping the opposite surface of said panel in cooperation with said base, and shoulders providing on said arms adjacent said base and extending generally outwardly from the plane of the latter, said shoulders being received in said bolt hole in generally abutting relationship with a defining surface thereof and retaining the bolt holder in attached position.

References Cited in the file of this patent

UNITED STATES PATENTS

| | | |
|---|---|---|
| 2,115,312 | Lombard | Apr. 26, 1938 |
| 2,180,266 | Tinnerman | Nov. 14, 1939 |
| 2,236,850 | Hansman | Apr. 1, 1941 |
| 2,382,942 | Murphy | Aug. 14, 1945 |
| 2,495,037 | Tinnerman | Jan. 17, 1950 |
| 2,558,720 | Hansman | July 3, 1951 |
| 2,562,001 | Tinnerman | July 24, 1951 |
| 2,605,806 | Tinnerman | Aug. 5, 1952 |
| 2,654,411 | Bedford | Oct. 6, 1953 |
| 2,676,635 | Tinnerman | Apr. 27, 1954 |